United States Patent
Takahashi et al.

(10) Patent No.: US 7,044,472 B2
(45) Date of Patent: May 16, 2006

(54) COMBINED STEEL OIL CONTROL RING

(75) Inventors: Akira Takahashi, Saitama (JP); Kazutomo Takahashi, Saitama (JP)

(73) Assignee: Nippon Piston Ring Co., Ltd., Saitama-ken (JP)

( * ) Notice: Subject to any disclaimer, the term of this patent is extended or adjusted under 35 U.S.C. 154(b) by 433 days.

(21) Appl. No.: 10/289,391

(22) Filed: Nov. 7, 2002

(65) Prior Publication Data

US 2003/0090066 A1 May 15, 2003

(30) Foreign Application Priority Data

Nov. 15, 2001 (JP) .................................... 2001-350135

(51) Int. Cl.
*F16J 9/00* (2006.01)

(52) U.S. Cl. .................. 277/434; 277/435; 277/437

(58) Field of Classification Search .............. 277/434, 277/435, 437

See application file for complete search history.

(56) References Cited

U.S. PATENT DOCUMENTS 4,762,329 A * 8/1988 Kooroki .................. 277/479

FOREIGN PATENT DOCUMENTS

JP          1-78768 U      5/1989

* cited by examiner

*Primary Examiner*—Alison Rickard
*Assistant Examiner*—E Peavey
(74) *Attorney, Agent, or Firm*—Birch, Stewart, Kolasch & Birch, LLP

(57) ABSTRACT

A combined steel oil control ring is provided which has steel side rails and a steel spacer expander. The spacer expander includes ear portions for contacting the side rails. The ear portions are substantially equally spaced with respect to each other along the internal circumferential portion of the spacer expander. The ear portions have radially external circumferential surfaces adapted to press the side rails radially outwardly by using the resilient force caused by the spacer expander. The spacer expander has up-and-down contours formed circumferentially along the radially external circumferential surface, for preventing the side rails from circumferentially rotating relatively to the spacer expander. The up-and-down contours each include at least two axially extending groove regions and at least three axially extending flat regions. The groove regions and flat regions are dimensioned to extend the life span of the contours and the dies.

3 Claims, 3 Drawing Sheets

COMBINED STEEL OIL CONTROL RING

This nonprovisional application claims priority under 35 U.S.C. § 119(a) on Patent Application No. 2001-350135 filed in JAPAN on Nov. 15, 2001, which is herein incorporated by reference.

FIELD OF THE INVENTION

The present invention relates to a combined steel oil control ring for internal combustion engines including steel side rails and a steel spacer expander.

BACKGROUND OF THE INVENTION

A conventional combined steel oil control ring typically has a construction that combines steel side rails and a steel spacer expander. The spacer expander includes protruding portions axially extending from the body of the spacer expander like an ear (hereinafter referred to as ear portions) for contacting the side rails. The ear portions are substantially, equally spaced with repect to each other along the internal circumferential portion of the spacer expander. The radially external circumferential surface of the ear portions is adapted to press the side rails radially outwardly by using resilient force caused by the spacer expander. When using such a combined steel oil control ring, the side rails tend to circumferentially rotate relatively to the spacer expander, and, therefore, it is necessary to prevent such rotation from occurring, for achieving the effective performance of the oil control ring. To implement such prevention, an arrangement is proposed in Japanese Utility Model Unexamined Publication Jitsu-Kai-Hei (JP(U)) 1-78768. In the arrangement, the radially external circumferential surfaces of the ear portions contacting the internal circumferential portion of the side rails have contours, each consisting of repeatedly occurring circumferential flat surfaces and neighboring grooves recessed from the flat surfaces (hereinafter referred to as up-and-down contours), formed thereon. The contours are fine, or minute, in this case, like a saw tooth contour, having a tooth pitch of 25–250 μm and a tooth height of 15–180 μm.

The arrangement described in the publication above has a problem in that, because the up-and-down contours on the radially external circumferential surfaces of the ear portions are as fine, the contours easily wear out. When the contours wear out, not only do the side rails tend to circumferentially rotate relatively to the spacer expander, but also the capability of the side rails to follow up the cylinder of the internal combustion engine is caused to deteriorate, which in turn increases consumption of the lubricating oil.

The arrangement described in the publication above also has another problem in that metal molds, or dies, having protruding portions for forming the fine saw-tooth contours on the surfaces of the ear portions easily wear out. This is because each of the protruding portions of the die for forming the fine grooves of the saw tooth contours has a very narrow width as narrow as 12.5–125 μm, which, in turn, causes a deterioration or shortening of the life of the dies .

The present invention is made to solve the occurrence of the above problems in such a conventional combined steel oil control ring, as described above.

An object of the present invention is therefore to provide a combined steel oil control ring having side rails and a spacer expander adapted to press the side rails radially outwardly via ear portions of the spacer expander having up-and-down contours (as defined earlier), each formed along the external surfaces of ear portions of the spacer expander for preventing the side rails from circumferentially rotating relatively to the spacer expander, as described above. The oil control ring prevents wear from occurring in both the up-and-down contours formed on the surface of the ear portions, and in the protruding portions formed on a die for forming the up-and-down contours on the ear portions.

SUMMARY OF THE INVENTION

In order to accomplish the object described above, according to the present invention, an arrangement as described below is provided in a combined steel oil control ring having steel side rails and a steel spacer expander. The spacer expander includes ear portions for contacting the side rails, the ear portions being substantially equally spaced with respect to each other along the internal circumferential portion of the spacer expander. The arrangement includes the spacer expander provided with up-and-down contours each being formed circumferentially along the radially external circumferential surface. The up-and-down contours include at least two axially extending groove regions and at least three axially extending flat regions. The flat regions within each ear portion together have an aggregate circumferential width within a range of 30%–70% of an entire circumferential width of each ear portion.

The reason for establishing such a width range for the up-and-down contours is that, if the flat regions within each ear portion together have an aggregate circumferential width of less than 30% of the entire circumferential width of each ear portion, wear occurs in the up-and-down contours formed on the ear portions. In addition, if the flat regions within each ear portion together have an aggregate circumferential width exceeding 70% of the entire circumferential width of each ear portion, the side rails tend to circumferentially rotate relatively to the spacer expander though wear does not occur in the up-and-down contours formed on the ear portions. Preferably, the flat regions, or flat surfaces, of the up-and-down contours may be surface treated to have a surface roughness of 1–4 Rz.

The arrangement as described above has the outstanding advantage that, with the up-and-down contours formed circumferentially along the radially external circumferential surface of the ear portions of the spacer expander that the side rails contact, the side rails are prevented from circumferentially rotating relatively to the spacer expander and also the up-and-down contours themselves are prevented from wearing out. Such an advantage is obtained by causing both the flat regions within each ear portion together to have an aggregate circumferential width within a range of 30–70% and by causing the groove regions within each ear portion together to have an aggregate circumferential width within the range of 70–30%, of an entire circumferential width of each ear portion.

As for the wear of the dies, when the groove regions of each of the ear portions of the up-and-down contours have, for example, a depth of around 0.05 mm and a circumferential width of around 0.2 mm, then, the protruding regions of the die for forming the groove regions of the up-and-down contours have a width of around 0.2 mm and a height of around 0.05 mm, whereby the shortening of the lifespan of the die may be relatively small due to wear and tear.

Other objects and advantages of the present invention may become more apparent by referring to the following detailed description and accompanying drawings briefly described below.

DETAILED DESCRIPTION OF THE INVENTION

Hereunder, the present invention is described more in detail according to embodiments thereof, referring to drawings attached hereto.

Figure 1:
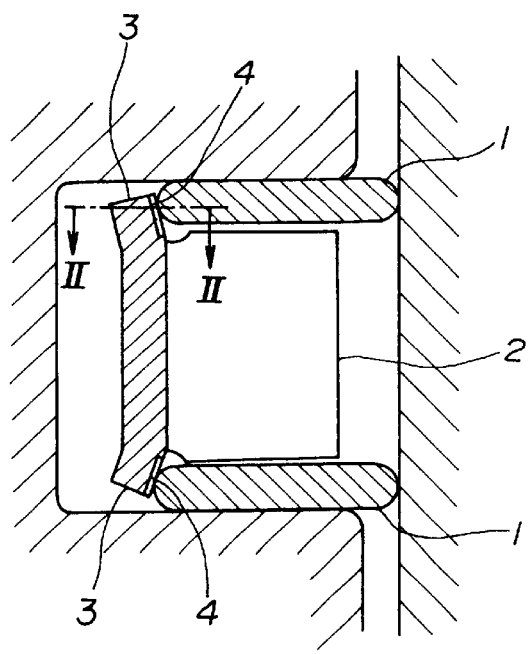
FIG. 1 is a cross-sectional view of a combined steel oil control ring according to an embodiment of the present invention.
Figure 2:
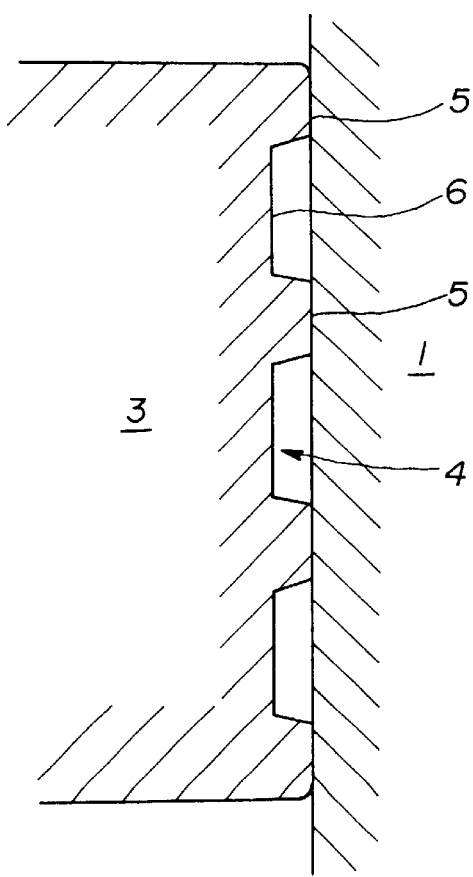
FIG. 2 is an enlarged cross-sectional view along arrow lines II—II of FIG. 1.

FIG. 1 is a cross-sectional view of a combined steel oil control ring according to an embodiment of the present invention, and FIG. 2 is an enlarged cross-sectional view along arrow lines II—II of FIG. 1.

As shown in FIG. 1, the combined steel oil control ring, according to the present invention, has steel side rails 1 and a steel spacer expander 2, having a wave-like shape circumferentially extending within a radial plane. The spacer expander 2 includes ear portions 3 axially protruding from the body of the spacer expander 2 for contacting the side rails 1. The ear portions 3 are substantially, equally spaced with each other along the internal circumferential portion of the spacer expander 2. The ear portions 3 have a radially external circumferential surface, respectively, for contacting the side rails 1, and are adapted to press the side rails 1 radially outwardly by the resilient force caused by the spacer expander 2.

As shown in FIGS. 1 and 2, the spacer expander 2, according to the present invention, comprises up-and-down contours 4 each formed circumferentially along the radially external circumferential surface of each ear portion 3. The up-and-down contours 4 each include at least two axially extending groove regions 6, three groove regions being shown in FIG. 2, and at least three axially extending flat regions 5 with four flat regions in this embodiment, as shown in FIG. 2.

The flat regions 5 within each ear portion 3 together have an aggregate circumferential width within the range of 30%–70% of the entire circumferential width of each ear portion 3. In groove regions 6, each of the up-and-down contours 4 have a depth of around 0.05 mm and a circumferential width of around 0.2 mm. The groove regions 6 within each ear portion 3 together have an aggregate circumferential width within a range of 70–30% of the entire circumferential width of each ear portion 3.

The up-and-down contours 4 engage with the side rails 1 by means of frictional contact with both side walls of the groove regions 6 and the flat surfaces of the flat regions 5 thereof to the side rails 1. This consequently prevents the side rails 1 from circumferentially rotating relatively to the spacer expander 2. Also, wear and tear seldom occurs in the up-and-down contours 4 because the flat regions 5 within each ear portion 3 together have an aggregate circumferential width equal to 30% or more.

The up-and-down contours 4 of the ear portions 3, the groove regions 6 thereof to be specific, are formed by using a die having at least two protruding portions, the number corresponding to the number of the groove regions 6, three in this case. Because the groove regions 6 each with up-and-down contours 4, have a circumferential width of around 0.2 mm, the protruding regions of the die have a width of around 0.2 mm, whereby the shortening of the life of the die due to wear may be relatively small.

Figure 3:
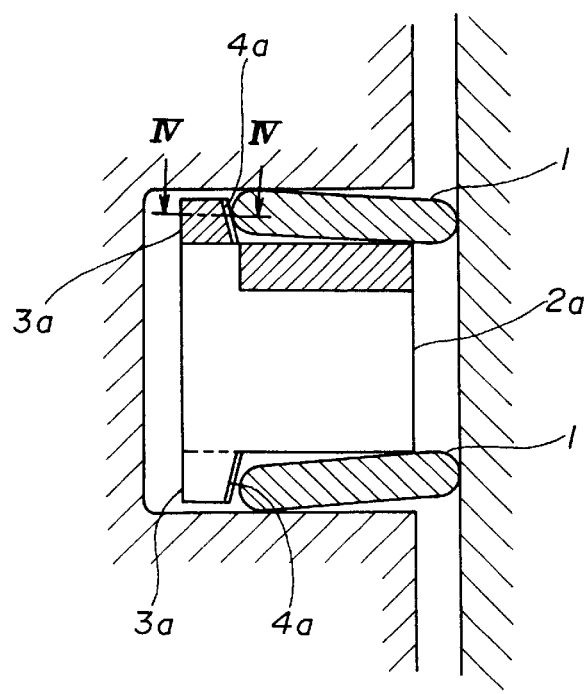
FIG. 3 is a view corresponding to FIG. 1 of a combined steel oil control ring according to another embodiment of the present invention.
Figure 4:
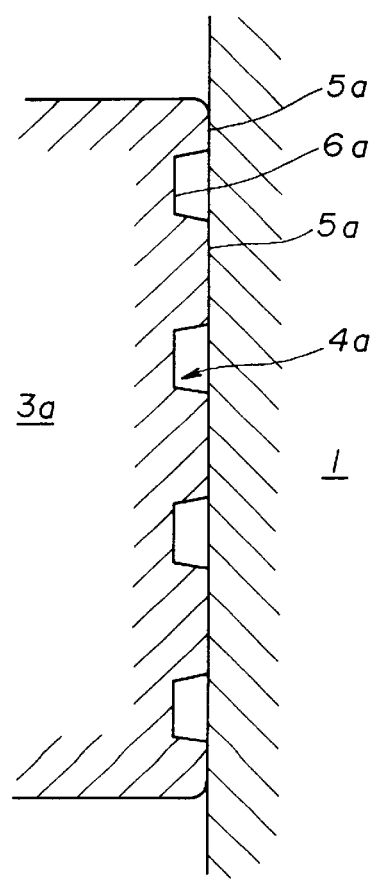
FIG. 4 is an enlarged cross-sectional view along arrow lines II—II of FIG. 3.
Figure 5:
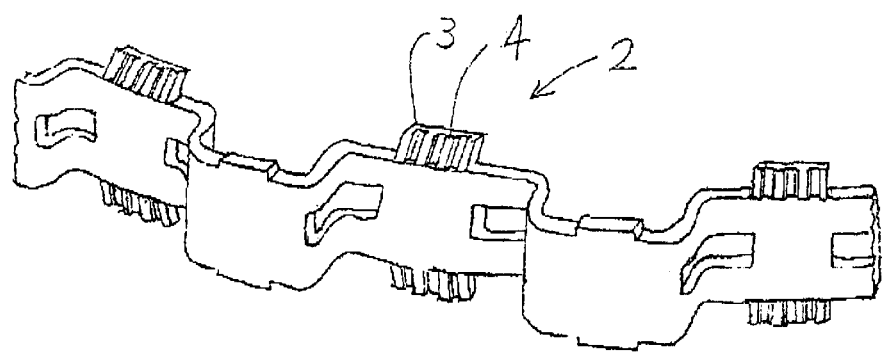
FIG. 5 is an isometric view of the spacer expander with its ear portions as shown in FIGS. 1 and 2.
Figure 6:
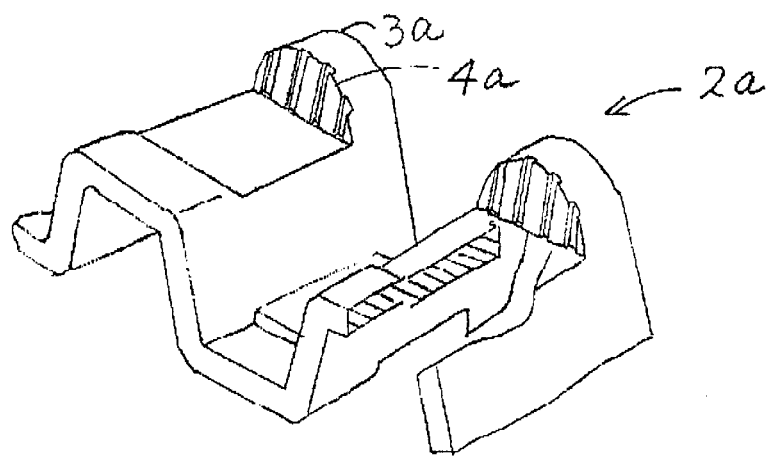
FIG. 6 is an isometric view of the spacer expander with its ear portions as shown in FIGS. 3 and 4.

Another combined steel oil control ring, according to another embodiment of the present invention is shown in FIGS. 3 and 4. Similar to the combined steel oil control ring shown in FIGS. 1 and 2, the combined steel oil control ring of the second embodiment has steel side rails 1 and a steel spacer expander 2a, with a wave-like configuration circumferentially extending within a radial plane, that includes ear portions 3a axially protruding from the body of the spacer expander 2a for contacting the side rails 1. The ear portions 3a are substantially equally spaced with respect to each other along the internal circumferential portion of the spacer expander 2a. The ear portions 3a each have respective radially external circumferential surface for contacting the side rails 1. The radially external circumferential surface is adapted to press the side rails 1 radially outwardly by using the resilient force caused by the spacer expander 2a. Also, like the first embodiment, the spacer expander 2a, according to the second embodiment of the present invention, includes up-and-down contours 4a, each formed circumferentially along the radially external circumferential surface of each ear portion 3a. The up-and-down contours 4a each include at least two axially extending groove regions 6a and at least three axially extending flat regions 5a. Different from the first embodiment, the second embodiment is arranged such that the up-and-down contours 4a include four groove regions 6a, instead of three, and five flat regions 5a, instead of four, as shown in FIG. 4.

The groove regions 6a of the up-and-down contours 4a have a depth of around 0.05 mm and a circumferential width of around 0.1 mm. The groove regions 6a within each ear portion 3a together have an aggregate circumferential width equal to 40% of an entire circumferential width of each ear portion 3a. The flat regions 5a within each ear portion 3a together have an aggregate circumferential width equal to 60% of an entire circumferential width of each ear portion 3a. Also, different from the first embodiment, the second embodiment is arranged such that the flat regions, or flat surfaces, 5a of the up-and-down contours 4a are finished to have a surface roughness of 1–4 Rz, by means of a surface treatment.

As described above, the flat regions 5a of the up-and-down contours 4a of the ear portions 3a for contacting the radially internal circumferential surfaces of the side rails 1, are finished to have a rough surface causing a high frictional force to be generated. Consequently, the side rails 1 are prevented from circumferentially rotating relatively to the spacer expander 2a.

Other features and advantages of the second embodiments are the same as those described above in connection with the first embodiment.

As described above, certain conventional combined steel oil control rings have been proposed to prevent the side rails from circumferentially rotating relatively to the spacer expander by providing an arrangement such that fine up-and-down contours were formed circumferentially on the radially internal circumferential surfaces of the ear portions for contacting the side rails. This arrangement had the disadvantage that because the up-and-down contours were too fine, i.e., like a saw tooth contour, not only the up-and-down contours formed on the ear portions but also the die for forming the up-and-down contours tended to wear readily.

Unlike such conventional combined steel oil control rings, the combined steel oil control ring according to the present invention, as described above, advantageously prevents the up-and-down contours 4, 4a from wearing. This, in turn, maintains for a long time the effects of preventing the side rails 1 from circumferentially rotating relatively to the spacer expander2, 2a. This outstanding advantage is achieved by forming the up-and-down contours 4, 4a circumferentially along the radially external circumferential surface of the ear portions 3, 3a that contact the side rails 1. The up-and-down contours 4, 4a, according to the present invention, each include at least two axially extending groove regions 6, 6a and at least three axially extending flat regions 5, 5a. In addition, the flat regions 5, 5a within each ear portion 3, 3a together have an aggregate circumferential width within the range of 30%–70% of the entire circumferential width of each ear portion 3, 3a. Furthermore, the combined steel oil control ring, according to the present invention, has another outstanding advantageous effect in that wear is also prevented from occurring in the protruding portions formed on dies for forming the up-and-down contours 4, 4a on the ear portions 3, 3a.

While there have been shown and described fundamental novel features of the present invention as applied to a preferred embodiment thereof, it will be understood that various modifications and changes to such embodiments may be made by those skilled in the art without departing from the spirit and scope of the invention. It is our intention, therefore, to be limited only as indicated by the scope of the claims appended hereto.

What is claimed is:

1. A combined steel oil control ring having steel side rails and a steel spacer expander, said spacer expander including ear portions for contacting the side rails, said ear portions being substantially equally spaced with respect to each other along an internal circumferential portion of said spacer expander, said ear portions having radially extending external, circumferential surfaces, said radially extending external circumferential surfaces of said ear portions being adapted to press said side rails radially outwardly through the use of the resilient force raised by the spacer expander, said spacer expander comprising:

up-and-down contours, each formed circumferentially along said radially external circumferential surface of said ear portions said up-and-down contours each including at least two axially extending groove regions and at least three axially extending flat regions within each of said ear portions and having an aggregate circumferential width within a range of 30%–70% of the entire circumferential width of each said ear portion.

2. The combined steel oil control ring according to claim 1, wherein the flat regions of the up-and-down contours are finished to have a surface roughness of 1–4 Rz.

3. The combined steel oil control ring of claim 1, wherein the contours have a substantially rectangular configuration.

* * * * *